United States Patent [19]

Bosotti

[11] 4,267,590

[45] May 12, 1981

[54] FIBER-OPTICAL DATA-COMMUNICATION SYSTEM USING CARRIERS OF DIFFERENT WAVELENGTHS

[75] Inventor: Luciano Bosotti, Turin, Italy

[73] Assignee: CSELT, Centro Studi e Laboratori Telecomunicazioni S.P.A., Turin, Italy

[21] Appl. No.: 49,507

[22] Filed: Jun. 18, 1979

[30] Foreign Application Priority Data

Jun. 20, 1978 [IT] Italy .............................. 68431 A/78

[51] Int. Cl.³ ............................................. H04B 9/00
[52] U.S. Cl. ..................................... 370/3; 455/600
[58] Field of Search ...................... 178/50, 58 R, 58 A, 178/119; 250/199; 179/15 FD, 15 AN; 340/147 C, 5 Y, 188 CH; 325/42, 55; 455/600, 601, 602, 603, 606, 607, 608, 611, 617, 618, 619; 375/1, 3, 4

[56] References Cited

U.S. PATENT DOCUMENTS

| 3,562,431 | 2/1971 | Inose et al. | 325/55 |
| 3,755,676 | 8/1973 | Kinsel | 250/199 |
| 3,875,534 | 4/1975 | Haven | 250/199 |
| 3,920,983 | 11/1975 | Schlafer et al. | 179/15 FD |

*Primary Examiner*—Thomas A. Robinson
*Attorney, Agent, or Firm*—Karl F. Ross

[57] ABSTRACT

A plurality of data-transmitting stations communicate with respective data-receiving stations via channels using optical carriers of different wavelengths, the several channels sharing a common light guide between an optical multiplexer at an outgoing terminal and an optical demultiplexer at an incoming terminal. To minimize cross-talk between channels, the data streams modulating their carriers are so synchronized that the signal peaks appearing beyond the demultiplexer on any pair of spectrally adjacent channels are relatively offset by half a signal period of their data streams or of the faster one of these two data streams. The synchronization can be carried out through electronic control of the channel modulators at the transmitting stations or with the aid of optical delay lines inserted in every other channel upstream of the multiplexer. A similar phase relationship is maintained between incoming and outgoing data streams at a subscriber station having a transmitter and a receiver communicating via an optical duplexer with a single light guide.

11 Claims, 12 Drawing Figures

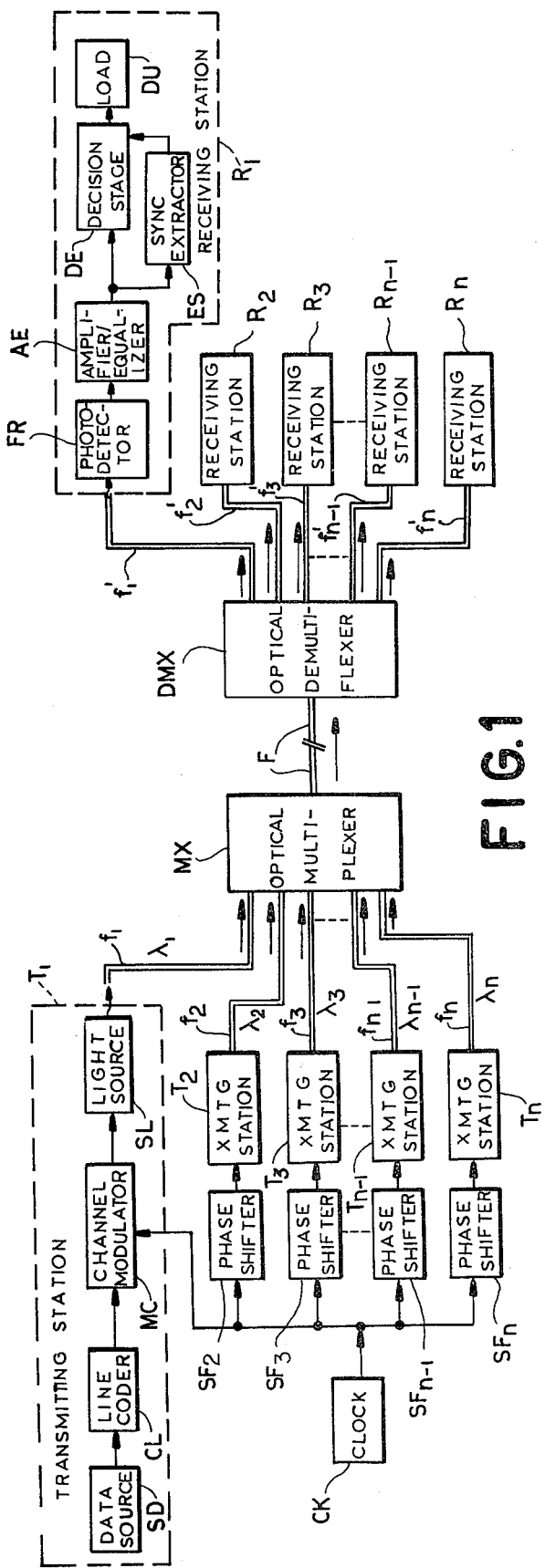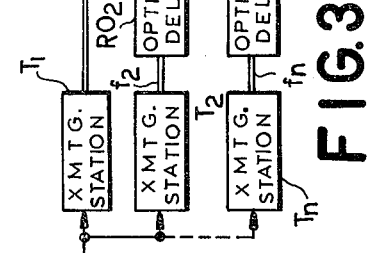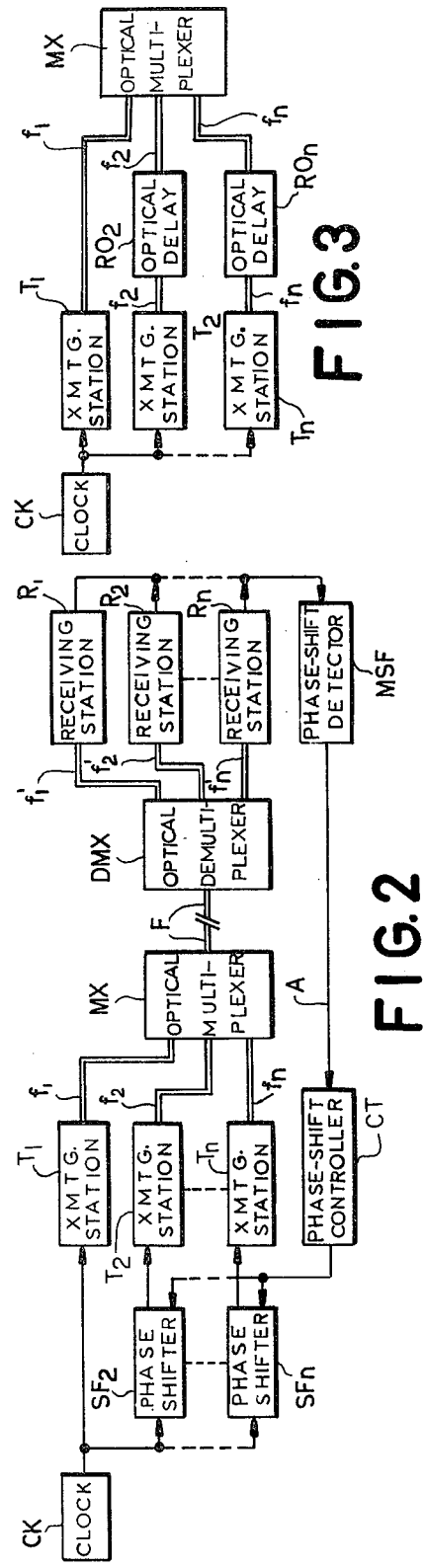

4,267,590

FIBER-OPTICAL DATA-COMMUNICATION SYSTEM USING CARRIERS OF DIFFERENT WAVELENGTHS

FIELD OF THE INVENTION

My present invention relates to a multichannel data-communication system of the fiber-optical type operating by wavelength-division multiplexing.

BACKGROUND OF THE INVENTION

In such a communication system, messages sent by several transmitters to respective receivers travel over paths sharing a common light guide between an optical multiplexer at an outgoing terminal and an optical demultiplexer at an incoming terminal. Each transmitter is linked with its associated receiver by an individual channel defined by an optical carrier of a particular wavelength differing from those of all the other carriers. These channels, accordingly, occupy predetermined relative positions in the spectrum of wavelengths which are not necessarily related to the geographic locations of the stations. In the ensuing description, the term "adjacent channels" refers to those channels whose carriers lie next to each other in that wavelength spectrum.

The number of channels that can be accommodated by a common light guide is limited by interference phenomena giving rise to cross-talk between adjacent channels. Thus, the carriers must be sufficiently spaced apart to minimize such interference.

Various solutions have already been proposed to overcome the problem of cross-talk. In an article (Paper C7.3) presented by H. Ishio and T. Miki at the IOOC '77 conference held in Tokyo, there has been described a comparison system in which the output signal of a photodetector receiving incoming signals from a channel of a wavelength-division-multiplex system is modified by a corrective electrical signal derived by suitable attenuation and polarity inversion from the optical inter-channel interference.

The output voltage or current of a photodetector oscillates in random fashion about a mean value constituting the useful signal. These oscillations account for a noise component of an amplitude proportional to the actual signal level. Since the noise accompanying an interfering signal is obviously uncorrelated with the noise accompanying the affected signal, the above-described compensation technique cannot reduce noise interference but is in fact likely to intensify same. This problem, accordingly, is specific to optical communication systems using photoelectric signal conversion.

Moreover, the level of the optically interfering signal must be exactly known to enable an effective reduction of cross-talk without further signal degradation. The electrical components needed for signal attenuation and polarity inversion also tend to introduce additional noise due in part to drift and instability phenomena.

OBJECT OF THE INVENTION

The object of my present invention, therefore, is to provide improved means for the suppression of cross-talk in a fiber-optical communication system of the type referred to with avoidance of the aforestated drawbacks.

SUMMARY OF THE INVENTION

I have found that, for a given level of interfering optical signals, the performance degradation in a multichannel optical system largely depends on the relative phasing of the mutually independent data streams modulating the carriers of adjacent channels. In fact, the phase dependence of cross-talk increases with the signal level.

Thus, I have determined that maximum degradation occurs when the data streams of adjacent channels (whose cadences are based on a common clock frequency) are in phase, with their signal peaks coinciding. Conversely, cross-talk is at a minimum when these data streams are relatively offset by half a signal period so that a peak on one channel coincides with a trough on the other channel. This assumes, of course, that the two signal periods are the same; if they are different but harmonically related, i.e. if the bit rate or cadence of one data stream is a multiple of the other, the offset should be by half the signal period of the data stream of higher cadence.

In accordance with my present invention, therefore, I provide synchronizing means connected to the channel modulator of at least one transmitter for staggering the signal period of its outgoing data stream with reference to that of the data stream of at least one other channel as observed at one of the terminals of the common light guide, more particularly at the incoming or receiving-side terminal in the case of unidirectional signaling. With two-way communication, as where a transmitter and a receiver of a subscriber station are coupled to the light guide through a duplexer at the proximal terminal of that guide, the offset should exist at this proximal terminal.

The synchronizing means according to my invention may be either an electronic phase shifter in the electrical path or an optical delay device in the light-guide path of a channel.

With this improved system, in which the adjacent channels are effectively in optical quadrature at the point of demodulation of at least one of their carriers, photodetection follows rather than precedes the suppression of interference so that no additional noise is introduced into the demodulated data stream ahead of the decision stage recognizing the incoming symbols. Since the reduction or elimination of cross-talk involves only the relative time position of the signals, no advance knowledge of the signal level is required. Finally, the electronic or optical phase shifters are inherently stable and thus do not cause any significant deterioration of the signal-to-noise ratio.

BRIEF DESCRIPTION OF THE DRAWING

The above and other features of my present invention will now be described in detail with reference to the accompanying drawing in which:

FIG. 1 is a block diagram of an optical multichannel data-communication system embodying my invention;

FIGS. 2–5 are diagrams similar to FIG. 1, illustrating partial modifications of that system;

SPECIFIC DESCRIPTION

Figure 5:
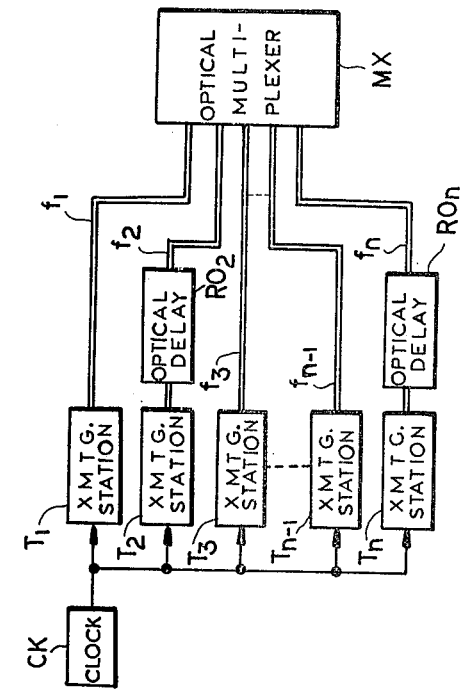

In FIG. 1 I have shown a plurality of transmitting stations $T_1, T_2, T_3, \ldots T_{n-1}, T_n$ communicating with respective receiving stations $R_1, R_2, R_3, \ldots R_{n-1}, R_n$ via transmission paths including individual light guides $f_1-f_n$ on the transmitting side, a common light guide F, and individual light guides $f'_1-f'_n$ on the receiving side. The two sets of individual light guides are coupled to the common guide F by an optical multiplexer MX at an outgoing terminal and an optical demultiplexer DMX at an incoming terminal. Transmitting station $T_1$, which is representative of all the other stations on the same side of light guide F, comprises a digital data source SD, a line coder CL, a channel modulator MC and a light source SL. The latter, which generates a carrier of wavelength $\lambda_1$, may be a light-emitting diode or a laser, for example. The remaining transmitting stations $T_2-T_n$ have carriers of wavelengths $\lambda_2-\lambda_n$, respectively.

The circuits MC of all the transmitting stations, which modulate the signals of the associated data sources upon the respective optical carriers, are controlled in parallel by a common clock CK. In the case of stations $T_2-T_n$, however, respective phase shifters $SF_2-SF_n$ are interposed between this clock and their channel modulators.

Each receiving station, as particularly illustrated for station $R_1$, comprises a photodetector FR working into an amplifier/equalizer AE whose output is fed to a decision stage DE controlled by a sync extractor ES which monitors the incoming data stream detected and amplified in circuits FR and AE. The symbols recovered in stage DE are fed to a load DU.

It will be assumed, for the sake of simplicity, that the several wavelengths $\lambda_1-\lambda_n$ vary progressively in the order in which they appear on the drawing so that the light waves emitted by stations $T_1$ and $T_2$, for example, constitute a pair of adjacent channels. The phase shifters introduced by devices $SF_2-SF_n$ are so chosen that the bit streams modulating the carriers $\lambda_2-\lambda_n$ are relatively offset by half a signal period, as defined above, at demultiplexer DMX where the channels are separated from one another. If the signals do not undergo a significant relative phase shift on their way to terminal DMX, i.e. if local guides $f_1-f_n$ and common guide F are short enough, this phase relationship can be taken into account in the design of the phase shifters which in that case need not be adjustable. In other situations, however, it may be necessary to determine the relative phasing of the arriving bit streams at the incoming terminal in order to establish the correct mode of operation for these phase shifters. Thus, as illustrated in FIG. 2, a phaseshift detector MSF monitors the received signals in the outputs of stations $R_1-R_n$ and transmits this information via an ancillary channel A to a control circuit CT adjusting the phase shifters $SF_2-SF_n$. The inputs of detector MSF could be connected in parallel with those of the sync extractors ES (FIG. 1) of the respective receiving stations.

Ancillary channel A could include a further optical carrier transmitted over the common guide F and separated from the other carriers by a spectral distance greater than that existing between adjacent message channels. Such a spacing makes it unnecessary to control the phase of the supervisory signals passing over this ancillary channel.

As illustrated in FIG. 3, the electronic phase shifters $SF_2-SF_n$ could be replaced by as many optical delay devices $RO_2-RO_n$ inserted in the corresponding local light guides $f_2-f_n$.

Figure 4:
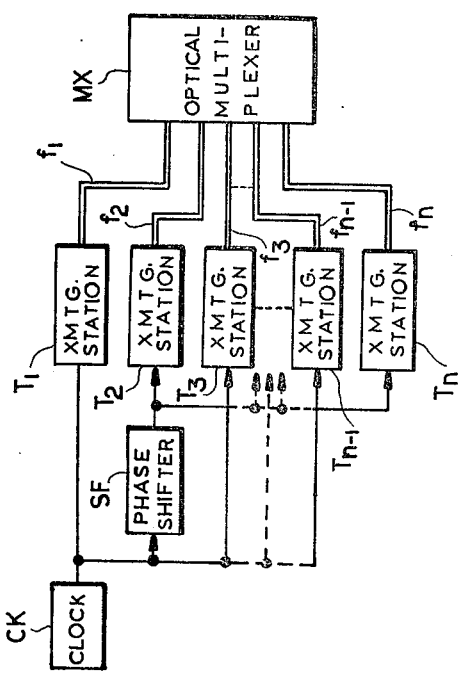

If relative phase shifts during transmission are insignificant, the simplified arrangement of FIG. 4 can be adopted in which a single phase shifter SF is inserted between clock CK and the channel modulators of every other transmitting station $T_2 \ldots T_n$ (n being assumed to be even). The odd-numbered stations $T_1, T_3, \ldots T_{n-1}$ are all connected directly to clock CK. If the bit rates or cadences controlled by clock CK are harmonically related but not identical for all stations, the phase shift introduced by device SF should correspond to half a signal period of the data stream having the highest cadence.

In an analogous arrangement shown in FIG. 5, phase shifter SF is replaced by optical delay devices $RO_2 \ldots RO_n$ inserted in every even-numbered local light guide $f_2 \ldots f_n$.

The system of FIG. 4 can also be made adaptive, with adjustment of phase shifter SF under the control of a monitoring circuit as shown at MSF and CT in FIG. 2, in order to compensate for possible variations in the transmission characteristics of the light guides or relative drifts of the data sources, provided that these variations affect the channels of all the parallel-connected stations in a similar manner.

Figure 6:
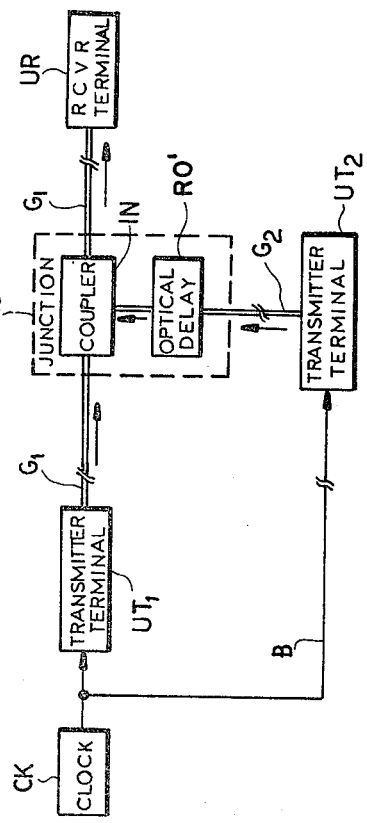
FIG. 6 is a simplified block diagram of a somewhat different system according to my invention.

In FIG. 6 I have shown two transmitter terminals $UT_1$ and $UT_2$ each of which may comprise one or more transmitting stations working into a respective light guide $G_1$ and $G_2$. Guide $G_2$ merges into guide $G_1$ at a junction AC through the intermediary of a conventional optical coupler IN. An associated receiver terminal UR, comprising as many receiving stations as there are transmitting stations in terminals $UT_1$ and $Ut_2$ combined, is connected to the opposite end of guide $G_1$ and has a structure similar to that shown in the right-hand portion of FIG. 1, including an optical demultiplexer. An optical multiplexer will of course be included in either or both transmitter terminals $UT_1$, $UT_2$ if such terminal encompasses more than one station.

Terminal $UT_1$ is controlled by a clock CK and may include one or more phase shifters or optical delay devices as shown in the preceding Figures. Terminal $UT_2$ receives the timing signal of clock CK by way of a link B which may again be an optical channel.

Junction AC further includes an optical delay device RO' inserted in guide $G_2$ for the purpose of collectively offsetting the data stream or streams from terminal $UT_2$ with reference to those originating at terminal $UT_1$ to provide the aforedescribed quadrature relationship between adjacent channels thereof. This offset is particularly important, even if the carriers of the two terminals lie in different wavelength ranges well separated from each other, where the distance of terminal $UT_2$ from junction Ac is substantially less than the distance of terminal $UT_1$ from that junction so that the signals arriving over guide $G_2$ are less attenuated and therefore of larger amplitude that those coming in on guide $G_1$.

Delay device RO' in guide $G_2$ could be replaced by one or more phase shifters in the electrical circuits of terminal $UT_2$, as described above with reference to FIGS. 1, 2 and 4. Such phase shifter or shifters may again be made adjustable under the control of a monitoring circuit of the type illustrated in FIG. 2.

Figure 7:
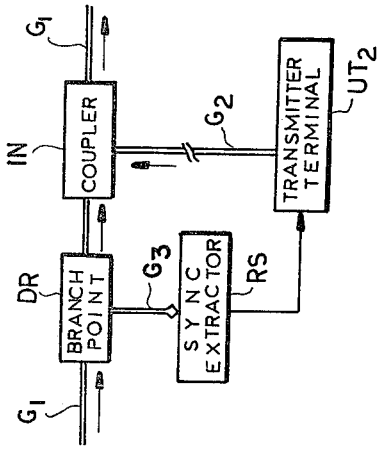
FIG. 7 is a partial diagram showing a modification of the system of FIG. 6.

According to FIG. 7, the connection B from the clock CK associated with terminal UT₁ can be replaced by a sync extractor RS including a photodetector to which part of the wave energy traveling on guide $G_1$ is fed via an ancillary guide $G_3$ branched off guide $G_1$ at a point DR just upstream of coupler IN.

It will be apparent that any number of transmitting terminals may be optically interconnected in the manner illustrated in FIG. 6 or 7. These terminals need not be controlled by a common clock, as in the system of FIG. 6, but could have individual clocks suitably synchronized with one another, e.g. in the manner shown in FIG. 7.

Figure 8:
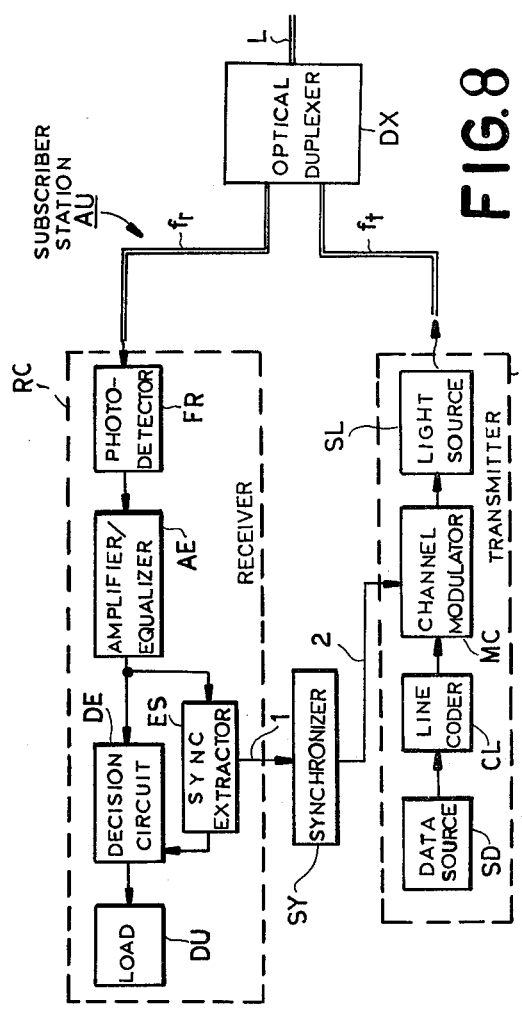
FIG. 8 is a block diagram of a transceiver station associated with a duplexing terminal of a light guide.

In FIG. 8 I have illustrated a subscriber station AU including a transmitter TR and a receiver RC respectively similar to stations $T_1$ and $R_1$ shown in FIG. 1. The sync extractor ES of receiver RC works into a synchronizer SY by way of a line 1; this synchronizer, in turn, controls the channel modulator MC of transmitter TR via a line 2. A common light guide L supplies incoming messages to receiver RC via an optical duplexer DX and a local light guide $f_r$ while carrying outgoing messages arriving from transmitter TR by way of a local guide $f_t$ and the duplexer. Here again, because of the proximity of the transmitter, substantial cross-talk would exist in the absence of the synchronizer even with widely separated wavelengths of the incoming and outgoing carriers.

Figure 9A:
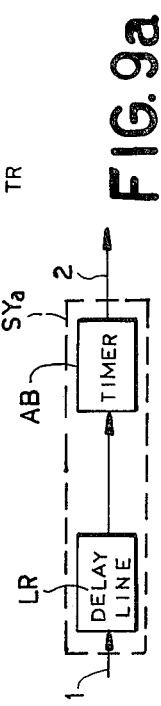
FIGS. 9a, 9b and 9c show three possible structures of a synchronizer used in the system of FIG. 8.
Figure 9B:
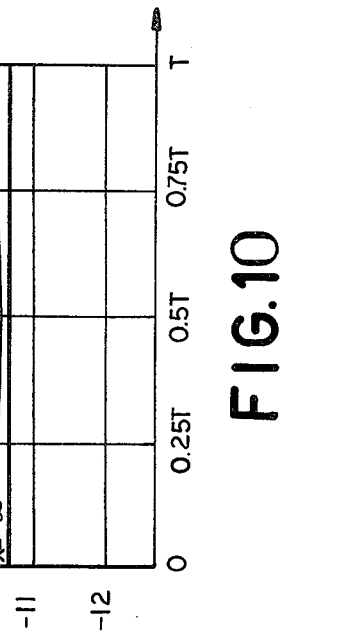
Figure 9C:
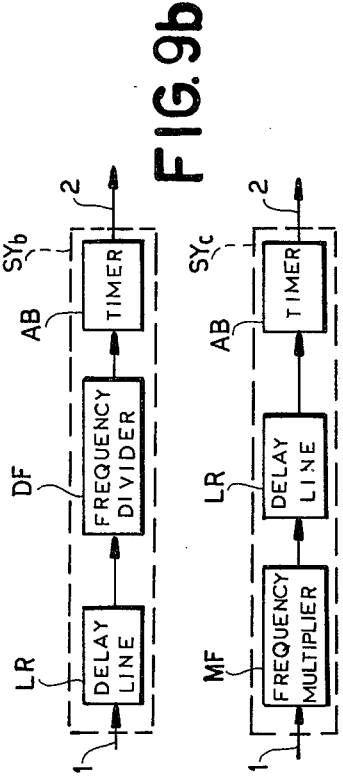

If receiver RC and transmitter TR operate with the same cadence, synchronizer SY may have the simple structure shown at $SY_a$ in FIG. 9a. This structure consists of a delay line LR followed by a timer AB generating control pulses for modulator MC, the delay of line LR being equal to half a signal period or possibly to an odd number of such half-periods. If receiver RC has a cadence which is a multiple of that of transmitter TR, the synchronizer should have the structure shown at $SY_b$ in FIG. 9b which includes a frequency divider DF inserted between delay line LR and timer AB; the step-down ratio of this divider corresponds to the ratio of the two cadences. Conversely, if the cadence of receiver RC is a submultiple of transmitter TR, a frequency multiplier MF of corresponding step-up ratio is inserted in a synchronizer $SY_c$, as illustrated in FIG. 9c.

Figure 10:
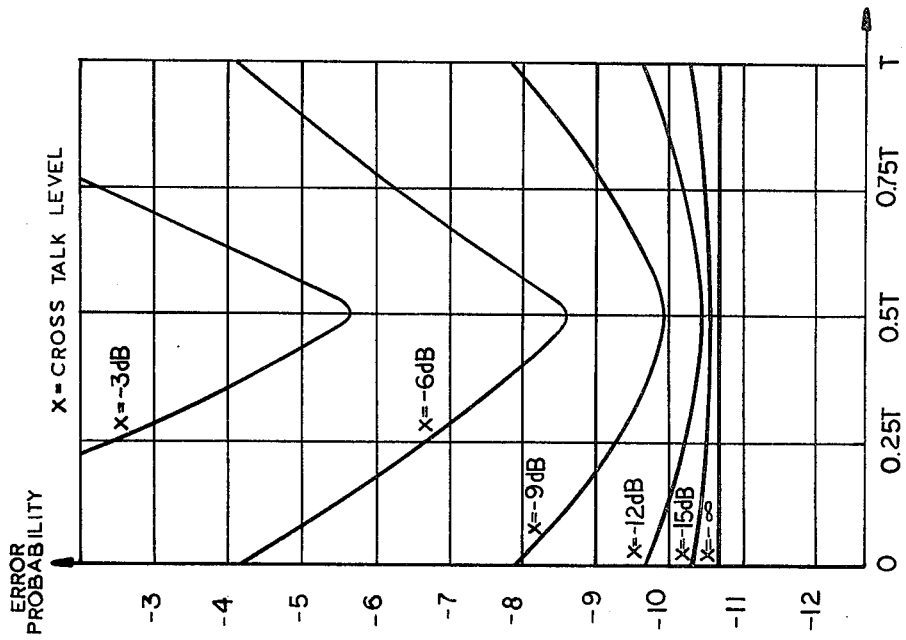
FIG. 10 is a set of graphs relating to the performance of a communication system according to my invention.

In FIG. 10 I have shown a set of graphs representing error probability at the decision stage DE (FIGS. 1 and 8) plotted against phase shift in terms of a signal period T, corresponding for instance to half a clock cycle. The several curves represent various relative signal levels X, ranging from −3dB to −∞, for a single interfering channel. It will be seen that in all instances the cross-talk is at a minimum for a relative phase displacement of 0.5T; the reduction of error probability is particularly significant where the level X of the interfering signal as measured at the affected channel is of the order of −6dB or higher.

I claim:

1. In a data-communication system in which data streams are modulated independently of one another but with cadences based on a common clock frequency upon a plurality of optical carriers of different wavelengths and the carriers so modulated pass between transmitters and receivers over respective channels sharing a common light guide between two terminals, each transmitter including a modulator establishing a predetermined signal period related to said clock frequency for symbols constituting its outgoing data stream, the combination therewith of synchronizing means connected to the modulator of at least one transmitter for staggering the signal period of its outgoing data stream with reference to that of the data stream of at least one other channel, as observed at one of said terminals, by substantially half the signal period of each of said data streams in the case of like signal periods and of the data stream of higher cadence in the case of harmonically related signal periods.

2. The combination defined in claim 1 wherein said terminals are a first terminal provided with an optical multiplexer combining the carriers from several transmitters and a second terminal provided with an optical demultiplexer distributing said carriers to their respective receivers, said synchronizing means keeping the peaks of the data streams of any two adjacent channels in the spectrum of carrier wavelengths staggered by substantially half a signal period at said second terminal.

3. The combination defined in claim 2 wherein said synchronizing means comprises a clock common to the modulators of said several transmitters and phase-shifting means inserted between said clock and at least some of said modulators.

4. The combination defined in claim 3, further comprising phase-detecting means connected to said respective receivers and controlling said phase-shifting means to compensate for relative phase delays encountered by the corresponding data streams along said common light guide.

5. The combination defined in claim 3 wherein the modulators associated with alternate channels in the spectrum of wavelengths are connected directly to said clock, said phase-shifting means being connected only to the modulators associated with the remaining channels.

6. The combination defined in claim 2 wherein said synchronizing means comprises optical delay means inserted in the paths of alternate channels in the spectrum of wavelengths between the corresponding transmitters and said optical multiplexer.

7. The combination defined in claim 3 wherein at least one further transmitter is connected to said common light guide by way of an ancillary light guide extending from a third terminal to a junction of said light guides, said synchronizing means further comprising a control connection from said clock to said further transmitter and optical delay means in said ancillary light guide.

8. The combination defined in claim 2 wherein at least one further transmitter is connected to said common light guide by way of an ancillary light guide extending from a third terminal to a junction of said light guides, said synchronizing means further comprising a sync-signal extractor connected to a branch of said common light guide in the vicinity of said junction and a control connection extending from said extractor to said further transmitter.

9. The combination defined in claim 1 wherein said one transmitter forms part of a duplexing terminal also comprising a receiver associated with said other channel and including a sync-signal extractor, said synchronizing means comprising delay means connected to said extractor and timing means in series with said delay means connected to the modulator of said transmitter.

10. The combination defined in claim 9 wherein the cadence of said receiver is a multiple of that of said transmitter, further comprising a frequency divider inserted between said delay means and said timing means.

11. The combination defined in claim 9 wherein the cadence of said receiver station is a submultiple of that of said transmitter, further comprising a frequency multiplier inserted between said extractor and said delay means.

* * * * *